US012762568B2

(12) United States Patent
Dicks

(10) Patent No.: US 12,762,568 B2
(45) Date of Patent: Oct. 13, 2026

(54) SYSTEMS AND METHODS FOR ORDERING AND PAYMENT

(71) Applicant: Life365, Inc., Scottsdale, AZ (US)

(72) Inventor: Kent Dicks, Scottsdale, AZ (US)

(73) Assignee: Life365, Inc., Scottsdale, AZ (US)

( * ) Notice: Subject to any disclaimer, the term of this patent is extended or adjusted under 35 U.S.C. 154(b) by 0 days.

(21) Appl. No.: 18/584,330

(22) Filed: Feb. 22, 2024

(65) Prior Publication Data

US 2024/0202734 A1 Jun. 20, 2024

Related U.S. Application Data

(63) Continuation of application No. 17/886,437, filed on Aug. 11, 2022, now abandoned, which is a continuation of application No. 17/006,494, filed on Aug. 28, 2020, now abandoned, which is a continuation of application No. 15/188,740, filed on Jun. 21, 2016, now abandoned, which is a continuation of application No. 15/174,632, filed on Jun. 6, 2016, now abandoned.

(60) Provisional application No. 62/171,944, filed on Jun. 5, 2015.

(51) Int. Cl.

| | |
|---|---|
| ***G06Q 20/40*** | (2012.01) |
| ***G06Q 20/24*** | (2012.01) |
| ***G06Q 20/28*** | (2012.01) |
| ***G06Q 30/0601*** | (2023.01) |

(52) U.S. Cl.

CPC ......... *G06Q 20/4018* (2013.01); *G06Q 20/24* (2013.01); *G06Q 20/28* (2013.01); *G06Q 20/401* (2013.01); *G06Q 30/0601* (2013.01)

(58) Field of Classification Search

CPC ................ G06Q 20/00–425; G06Q 30/00–08

See application file for complete search history.

(56) References Cited

U.S. PATENT DOCUMENTS

| | | | |
|---|---|---|---|
| 3,755,630 | A | 8/1973 | Boyer |
| 4,550,370 | A | 10/1985 | Baker |
| 5,006,699 | A | 4/1991 | Felkner et al. |

(Continued)

FOREIGN PATENT DOCUMENTS

| | | | |
|---|---|---|---|
| AU | 2002100889 | A4 | 6/2003 |
| WO | 0049549 | A1 | 8/2000 |

(Continued)

OTHER PUBLICATIONS

Mell et al., "The NIST Definition of Cloud Computing," National Institute of Standards and Technology (U.S. Department of Commerce), Special Publication 800-145, 7 pages (Sep. 2011).

(Continued)

*Primary Examiner* — Mohammad A. Nilforoush

(74) *Attorney, Agent, or Firm* — SNELL & WILMER L.L.P.

(57) ABSTRACT

Systems and methods for product ordering and payment are disclosed. Via use of the system, ordering and payment for items and services is simplified, secured, and made more convenient. Exemplary systems suggest orders, for example based on the location of the user, health information, and the like, and may automatically place orders with merchants. Payment may be made directly to the merchant from a user device, or indirectly through a payment issuer.

17 Claims, 10 Drawing Sheets

(56) References Cited

U.S. PATENT DOCUMENTS 5,404,485 A 4/1995 Ban
5,673,692 A 10/1997 Schulze et al.
5,721,780 A 2/1998 Ensor et al.
5,724,985 A 3/1998 Snell et al.
5,772,586 A 6/1998 Heinonen et al.
5,891,180 A 4/1999 Greeninger et al.
5,936,523 A 8/1999 West
6,024,699 A 2/2000 Surwit et al.
6,034,963 A 3/2000 Minami et al.
6,093,146 A 7/2000 Filangeri
6,302,844 B1 10/2001 Walker et al.
6,336,900 B1 1/2002 Alleckson et al.
6,402,691 B1 6/2002 Peddicord et al.
6,416,471 B1 7/2002 Kumar et al.
6,443,890 B1 9/2002 Schulze et al.
6,443,891 B1 9/2002 Grevious
6,478,736 B1 11/2002 Mault
6,485,418 B2 11/2002 Yasushi et al.
6,579,231 B1 6/2003 Phipps
6,580,948 B2 6/2003 Haupert et al.
6,598,084 B1 7/2003 Edwards et al.
6,625,642 B1 9/2003 Naylor et al.
6,789,157 B1 9/2004 Lilja et al.
6,790,178 B1 9/2004 Mault et al.
6,804,558 B2 10/2004 Haller et al.
6,807,965 B1 10/2004 Hickle
6,893,396 B2 5/2005 Schulze et al.
6,903,657 B2 6/2005 Kwoen
6,915,267 B2 7/2005 Jackson et al.
6,957,107 B2 10/2005 Rogers et al.
6,970,969 B2 11/2005 Wong et al.
6,978,182 B2 12/2005 Mazar et al.
7,039,810 B1 5/2006 Nichols
7,044,911 B2 5/2006 Drinan et al.
7,129,836 B2 10/2006 Lawson et al.
7,134,996 B2 11/2006 Bardy
7,154,398 B2 12/2006 Chen et al.
7,156,808 B2 1/2007 Quy
7,161,484 B2 1/2007 Tsoukalis
7,181,017 B1 2/2007 Nagel
7,231,258 B2 6/2007 Moore et al.
7,242,306 B2 7/2007 Wildman et al.
7,265,676 B2 9/2007 Krause et al.
7,311,666 B2 12/2007 Stupp et al.
7,414,534 B1 8/2008 Kroll et al.
7,438,216 B2 10/2008 Ambekar et al.
7,590,191 B1 9/2009 Macrae
7,598,878 B2 10/2009 Goldreich
7,733,224 B2 6/2010 Tran
7,761,261 B2 7/2010 Shmueli et al.
7,953,873 B1 * 5/2011 Madurzak ............. G06Q 30/02 709/229
8,126,728 B2 2/2012 Dicks et al.
8,126,729 B2 2/2012 Dicks et al.
8,126,730 B2 2/2012 Dicks et al.
8,126,731 B2 2/2012 Dicks et al.
8,126,732 B2 2/2012 Dicks et al.
8,126,733 B2 2/2012 Dicks et al.
8,126,734 B2 2/2012 Dicks et al.
8,126,735 B2 2/2012 Dicks et al.
8,131,564 B2 3/2012 Dicks et al.
8,131,565 B2 3/2012 Dicks et al.
8,131,566 B2 3/2012 Dicks et al.
8,140,356 B2 3/2012 Dicks et al.
8,155,982 B2 4/2012 Dicks et al.
8,209,195 B2 6/2012 Dicks et al.
8,214,549 B2 7/2012 Dicks et al.
8,398,546 B2 3/2013 Pacione et al.
8,446,275 B2 5/2013 Utter, II et al.
8,548,828 B1 10/2013 Longmire
8,644,929 B2 2/2014 Diebold et al.
8,677,054 B1 3/2014 Meir et al.
8,725,843 B2 5/2014 Lockridge et al.
8,734,296 B1 5/2014 Brumback et al.
8,793,522 B2 7/2014 Rahman et al.
8,825,428 B2 9/2014 Addison et al.
8,830,913 B1 9/2014 Sosa et al.
8,868,377 B2 10/2014 Yuen et al.
8,886,576 B1 11/2014 Sanketi et al.
8,909,543 B2 12/2014 Tropper et al.
8,920,332 B2 12/2014 Hong et al.
9,026,053 B2 5/2015 Molettiere et al.
9,031,812 B2 5/2015 Roberts et al.
9,042,971 B2 5/2015 Brumback et al.
9,048,923 B2 6/2015 Molettiere et al.
9,089,760 B2 7/2015 Tropper
9,106,307 B2 8/2015 Molettiere et al.
9,258,775 B1 2/2016 Sosa et al.
9,443,263 B1 9/2016 Kim
9,451,911 B1 9/2016 Mirov et al.
9,871,575 B2 1/2018 Wengrovitz et al.
9,974,492 B1 5/2018 Dicks et al.
10,185,513 B1 1/2019 Vandewater
10,388,411 B1 8/2019 Dicks et al.
10,560,135 B1 2/2020 Dicks et al.
2001/0005772 A1 6/2001 Kisakibaru
2001/0051787 A1 12/2001 Haller et al.
2002/0029157 A1 3/2002 Marchosky
2002/0072933 A1 6/2002 Vonk et al.
2002/0116698 A1 8/2002 Lurie et al.
2002/0128804 A1 9/2002 Geva
2003/0009088 A1 1/2003 Korth et al.
2003/0018742 A1 1/2003 Imago
2003/0050539 A1 3/2003 Naghavi et al.
2003/0065805 A1 * 4/2003 Barnes, Jr. ......... G06Q 30/0643 709/244
2003/0066065 A1 4/2003 Larkin
2003/0072424 A1 4/2003 Evans et al.
2003/0088295 A1 5/2003 Cox
2003/0088441 A1 5/2003 McNerney
2003/0095675 A1 5/2003 Marlow et al.
2003/0149593 A1 8/2003 Mok et al.
2003/0212632 A1 * 11/2003 Keogh .................. G06Q 20/04 705/40
2003/0216625 A1 11/2003 Phipps
2004/0015132 A1 1/2004 Brown
2004/0078220 A1 4/2004 Jackson
2004/0097796 A1 5/2004 Berman et al.
2004/0100376 A1 5/2004 Lye et al.
2004/0102683 A1 5/2004 Khanuja et al.
2004/0122488 A1 6/2004 Mazar et al.
2004/0127775 A1 7/2004 Miyazaki et al.
2004/0133080 A1 7/2004 Mazar et al.
2004/0152961 A1 8/2004 Carlson et al.
2004/0176983 A1 9/2004 Birkett et al.
2004/0199056 A1 10/2004 Husemann et al.
2004/0210458 A1 10/2004 Evans et al.
2005/0002341 A1 1/2005 Lee et al.
2005/0004700 A1 1/2005 Dimaggio
2005/0010911 A1 1/2005 Kim et al.
2005/0021370 A1 1/2005 Riff et al.
2005/0038680 A1 2/2005 McMahon
2005/0060187 A1 3/2005 Gottesman
2005/0065418 A1 3/2005 Ginor
2005/0065815 A1 3/2005 Mazar et al.
2005/0070767 A1 3/2005 Maschke
2005/0119580 A1 6/2005 Eveland
2005/0137465 A1 6/2005 Cuddihy et al.
2005/0149358 A1 7/2005 Sacco et al.
2005/0171410 A1 8/2005 Hjelt et al.
2005/0171762 A1 8/2005 Ryan et al.
2005/0192649 A1 9/2005 Shehadeh et al.
2005/0197545 A1 9/2005 Hoggle
2005/0203775 A1 9/2005 Chesbrough
2005/0216311 A1 9/2005 Gmelin
2005/0234307 A1 10/2005 Heinonen et al.
2005/0234742 A1 10/2005 Hodgdon
2005/0240111 A1 10/2005 Chung
2005/0251583 A1 11/2005 Rothman et al.
2005/0286306 A1 12/2005 Srinivasan et al.
2006/0020302 A1 1/2006 Torgerson et al.
2006/0026118 A1 2/2006 Jung et al.
2006/0035669 A1 2/2006 Chuprun et al.
2006/0036134 A1 2/2006 Tarassenko et al.

(56) References Cited

U.S. PATENT DOCUMENTS

2006/0036802 A1 2/2006 Drukin
2006/0063980 A1 3/2006 Hwang et al.
2006/0064320 A1 3/2006 Postrel
2006/0080680 A1 4/2006 Anwar et al.
2006/0089542 A1 4/2006 Sands
2006/0106806 A1 5/2006 Sperling et al.
2006/0111079 A1 5/2006 Tischer
2006/0116744 A1 6/2006 Von Arx et al.
2006/0135858 A1 6/2006 Nidd et al.
2006/0142648 A1 6/2006 Banet et al.
2006/0161222 A1 7/2006 Haubrich et al.
2006/0167346 A1 7/2006 Sarel
2006/0200007 A1 9/2006 Brockway et al.
2006/0202816 A1 9/2006 Crump et al.
2006/0205564 A1 9/2006 Peterson
2006/0212316 A1 9/2006 Jackson et al.
2006/0218011 A1 9/2006 Walker et al.
2006/0235280 A1 10/2006 Vonk et al.
2006/0242295 A1 10/2006 Husemann et al.
2006/0247549 A1 11/2006 Chan
2006/0253301 A1 11/2006 Simms et al.
2006/0270421 A1 11/2006 Phillips et al.
2006/0293607 A1 12/2006 Alt et al.
2007/0002791 A1 1/2007 Kasprzyk
2007/0004969 A1 1/2007 Kong et al.
2007/0015974 A1 1/2007 Higgins et al.
2007/0016450 A1 1/2007 Bhora et al.
2007/0033072 A1 2/2007 Bildirici
2007/0055552 A1 3/2007 St Clair et al.
2007/0061167 A1 3/2007 Brown
2007/0073266 A1 3/2007 Chmiel et al.
2007/0078497 A1 4/2007 Vandanacker
2007/0083246 A1 4/2007 Mazar et al.
2007/0135855 A1 6/2007 Foshee et al.
2007/0143398 A1 6/2007 Graham
2007/0171076 A1 7/2007 Stevens et al.
2007/0188323 A1 8/2007 Sinclair et al.
2007/0239229 A1 10/2007 Masoud et al.
2007/0250130 A1 10/2007 Ball et al.
2007/0253380 A1 11/2007 Jollota et al.
2007/0267475 A1 11/2007 Hoglund et al.
2007/0276283 A1 11/2007 Hung
2008/0010088 A1 1/2008 Ben-Attar et al.
2008/0028879 A1 2/2008 Robinette et al.
2008/0059239 A1 3/2008 Gerst et al.
2008/0065412 A1 3/2008 Vallone
2008/0082968 A1 4/2008 Chang et al.
2008/0097910 A1 4/2008 Dicks et al.
2008/0126131 A1 5/2008 Lou
2008/0126742 A1 5/2008 Shupak et al.
2008/0129518 A1 6/2008 Carlton-Foss
2008/0221921 A1 9/2008 Love et al.
2008/0301158 A1 12/2008 Brown et al.
2009/0048865 A1 2/2009 Breazeale
2009/0058611 A1 3/2009 Kawamura et al.
2009/0099864 A1 4/2009 Cronrath et al.
2009/0112630 A1 4/2009 Collins et al.
2009/0113413 A1 4/2009 Reinz
2009/0138207 A1 5/2009 Cosentino et al.
2009/0150416 A1 6/2009 Baker et al.
2009/0172773 A1 7/2009 Moore
2009/0204434 A1 8/2009 Breazeale
2009/0233579 A1 9/2009 Castell et al.
2009/0249443 A1 10/2009 Fitzgerald et al.
2009/0299766 A1 12/2009 Friedlander et al.
2010/0007469 A1 1/2010 Cardullo
2010/0045425 A1 2/2010 Chivallier
2010/0299158 A1 11/2010 Siegel et al.
2011/0004574 A1 1/2011 Jeong et al.
2011/0093287 A1 4/2011 Dicks et al.
2011/0106227 A1 5/2011 Desiderio et al.
2011/0124310 A1 5/2011 Theilmann et al.
2011/0167110 A1 7/2011 Hoffberg et al.
2011/0179405 A1 7/2011 Dicks et al.
2012/0005445 A1 1/2012 Escandell et al.
2012/0102633 A1 5/2012 Aulenbach
2012/0109873 A1 5/2012 Xiong et al.
2012/0209657 A1 8/2012 Connolly
2012/0209749 A1* 8/2012 Hammad ............... G06Q 20/20 705/27.1
2012/0265866 A1 10/2012 Stanciu et al.
2012/0266251 A1 10/2012 Birtwhistle et al.
2013/0041290 A1 2/2013 Kording et al.
2013/0066644 A1 3/2013 Dicks et al.
2013/0121116 A1 5/2013 Lee
2013/0132465 A1 5/2013 Brown
2013/0218588 A1 8/2013 Kehr et al.
2013/0226612 A1 8/2013 Carmeli et al.
2013/0290005 A1 10/2013 Vesto et al.
2014/0025398 A1 1/2014 Ridgeway
2014/0046391 A1 2/2014 Cowan et al.
2014/0052475 A1 2/2014 Madan et al.
2014/0142963 A1 5/2014 Hill et al.
2014/0239065 A1 8/2014 Zhou et al.
2014/0249658 A1 9/2014 Curry
2014/0257877 A1* 9/2014 L'Heureux ............ G06Q 30/06 705/5
2014/0273824 A1 9/2014 Fenner et al.
2014/0273858 A1 9/2014 Panther et al.
2014/0275852 A1 9/2014 Hong et al.
2014/0276244 A1 9/2014 Kamyar
2014/0278941 A1 9/2014 Livingston et al.
2014/0300490 A1 10/2014 Kotz et al.
2014/0316981 A1* 10/2014 Muthukrishnan ...... G06Q 20/12 705/40
2014/0330654 A1* 11/2014 Turney ................... G06Q 20/14 705/15
2014/0378777 A1 12/2014 Conrad et al.
2015/0157274 A1 6/2015 Ghassemzadeh et al.
2015/0161331 A1 6/2015 Oleynik
2015/0172441 A1 6/2015 Samhat
2015/0173631 A1 6/2015 Richards et al.
2015/0182160 A1 7/2015 Kim et al.
2015/0185042 A1 7/2015 Crawford et al.
2015/0185762 A1 7/2015 Magi
2015/0228062 A1 8/2015 Joshi et al.
2015/0238692 A1 8/2015 Peterson et al.
2015/0289820 A1 10/2015 Miller et al.
2015/0305690 A1 10/2015 Tan et al.
2015/0335282 A1 11/2015 Lee
2016/0014129 A1 1/2016 Park et al.
2016/0034696 A1 2/2016 Jooste et al.
2016/0051191 A1 2/2016 Miller et al.
2016/0078739 A1 3/2016 Burton et al.
2016/0092659 A1 3/2016 Wei
2016/0094525 A1 3/2016 Lin et al.
2016/0128626 A1 5/2016 Johnson et al.
2016/0171591 A1 6/2016 Williams et al.
2016/0231812 A1 8/2016 Hansen et al.
2016/0242658 A1 8/2016 Lisogurski
2016/0246392 A1 8/2016 Liu et al.
2016/0261147 A1 9/2016 Blum et al.
2016/0270717 A1 9/2016 Luna et al.
2016/0327979 A1 11/2016 Lettow
2016/0364972 A1 12/2016 Torti
2016/0374124 A1 12/2016 Gothe et al.
2016/0379473 A1 12/2016 Bharti et al.
2017/0005504 A1 1/2017 Rho et al.
2017/0010664 A1 1/2017 Tanaka et al.
2017/0068533 A1 3/2017 Kiaie et al.
2017/0076522 A1 3/2017 Ives-Halperin et al.
2017/0083312 A1 3/2017 Pindado et al.
2017/0093582 A1 3/2017 Keidar et al.
2017/0132613 A1 5/2017 Tunnell et al.
2017/0198349 A1 7/2017 Rice
2017/0212989 A1 7/2017 Laborde et al.
2017/0263113 A1 9/2017 Tiberi et al.
2017/0308666 A1 10/2017 Thomson et al.
2019/0095119 A1 3/2019 Vandewater et al.
2019/0107969 A1 4/2019 Vandewater et al.

(56) References Cited

U.S. PATENT DOCUMENTS

FOREIGN PATENT DOCUMENTS

| | | | |
|---|---|---|---|
| WO | 02058307 | A2 | 7/2002 |
| WO | 2005079667 | A1 | 9/2005 |
| WO | 2005101279 | A2 | 10/2005 |
| WO | 2006006159 | A1 | 1/2006 |
| WO | 2006060669 | A2 | 6/2006 |

OTHER PUBLICATIONS

Jeroen Van Den Brand et al., "Flexible and Stretchable Electronics" 2015, pp. 116-120, in Solid-State Electronics 113.

Douglas Hackler et al, "Enabling Electronics With Physically Flexible I Cs and Hybrid Manufacturing" 2015, pp. 633-643, in Proceedings of the IEEE, vol. 103, No. 4.

Kuniharu Takei, "Toward Flexible and Wearable Human-Interactive Health-Monitoring Devices" 2014, Advanced Healthcare Mater, vol. 4, pp. 487-500.

Yang Gao, "Crack-Insensitice Wearable Electronics Enabled Through High-Strength Kevlar Fabrics" 2015, IEEE Transactions on Components, Packaging and Manufacturing Technology.

Michael P GAJ, "Organic light-emitting diodes on shape memory polymer substrates for wearable electronic" 2015, Organic Electronics, vol. 25, pp. 151-155.

Blount et al., "Remote health-care monitoring using Personal Care Connect", IBM Systems Journal, vol. 46, No. I, pp. 95-113, (2007).

Milenkovic et al., "Wireless sensor networks for personal health monitoring: Issues and an implementation", Computer Communications, 13 pages (2006).

Setton et al., "Bluetooth sensors for wireless home and hospital healthcare monitoring", Cyberfab, 6 pages, date unknown.

Korhonen et al., "Health Monitoring in the Home of the Future", IEEE Engineering in Medicine and Biology Magazine, pp. 66-73 (May/Jun. 2003).

"WHMS—Wearable Health Monitoring Systems", Electrical and Computer Engineering, The University of Alabama in Huntsville, http://www.ece.uah.edu/-jovanov/whrms/, 13 pages.

Hung et al., "Implementation of a W AP-Based Telemedicine System for Patient Monitoring" IEEE Transactions of Information Technology in Biomedicine, vol. 7, No. 2, pp. 101-107 (Jun. 2003).

Lee et al., "Design and Implementation of a Mobile-Care System over Wireless Sensor Network for Home Healthcare Applications", Proceedings of the 28th IEEE EMBS Annual International Conference, pp. 6004-6007 (Aug./Sep. 2006).

Chen et al., "An i-Mode Portable Healthcare Monitor", Proceedings of the Second Joint EMBS/BMES Conference, IEEE, pp. 1851-1852 (2002).

Kuo et al., "Design and Implementation of Internet-Based In-House Healthcare and Home Automation Systems", IEEE, pp. 2944-2949 (2003).

Jov Anov et al., "Stress Monitoring Using a Distributed Wireless Intelligent Sensor System", IEEE Engineering in Medicine and Biology Magazine, pp. 49-55 (May/Jun. 2003).

Lubrin et al., "Wireless Remote Healthcare Monitoring with Motes", Proceedings of the International Conference on mobile Business, IEEE Computer Society, 7 pages (2005).

Guo et al., "Implementing a wireless portable healthcare monitoring system for physiological signals", The Institute of Engineering and Technology, 1 page (2007).

Otto et al., "System Architecture of a Wireless Body Area Sensor Network for Ubiquitous Health Monitoring", Journal of Mobile Multimedia, vol. 1, No. 4., pp. 307-326 (2006).

Yu et al., "A Wireless Physiological Signal Monitoring System with Integrated Bluetooth and WiFi Technologies", Proceedings of the 2005 IEEE Engineering in Medicine and Biology 27th Annual Conference pp. 2203-2206 (2005).

"Body Area Networks—A "Healthy Aims" Projects", Zarlink Semiconductor Inc., 1 page (2007).

"Bionformatics" downloaded from webpage http://en.wikipedia.org/wiki/Bioinformatics on Aug. 2, 2007 (9 pages).

Mintz, "Microsoft Launches Health Records Site," downloaded from webpage http:/ /bz.yahoo.com/ap/071004/microsoft_ healthvault.html? .v= 1 on Dec. 18, 2007 (3 pages).

"Bluetooth Sig Aims to Improve Healthcare Experience Through Interoperability," downloaded from webpage http://www.bluetooth.com1Bluetooth/Press/SIG/BLUETOOTH SIG_ AIMS_ TO_ IMPROVE_HEALTHCARE EXPERIENCE Through INTEROPERABILITY.htm (2 nae:es).

How PGP Works, http://www.pgpi.org/doc/pgpintro/.

Princeton University Wordnet; http://wordnetweb.princeton.edu/perl/webwn?s=event; accessed Dec. 19, 2010.

Doc004(http://www.frascati.enea.it/documentation/tru6450/SUPPDOCS/OBJSPEC/DOCU 004 .H TM (Year: 2005).

Tool Interface Standard (TIS) Executable and Linking Format (ELF) Specification Version 1.2, TIS Committee, May 1995, pp. 1-106.

Honda et al., "Wearable, Human-Interactive, Health-Monitoring, Wireless Devices Fabricated by Macroscale Printing Techniques," Advanced Functional Materials, vol. 24, pp. 3299-3304, (2014).

Tajima et al., "Truly Wearable Display Comprised of a Flexible Battery, Flexible Display Panel, and Flexible Printed Circuit," Journal of the Society for Information Display, vol. 22( 5), pp. 23 7-244, (2015).

United States Patent and Trademark Office, Office Action received in U.S. Appl. No. 19/072,628, mailed May 8, 2025.

United States Patent and Trademark Office, Office Action received in U.S. Appl. No. 19/075,505, mailed Jun. 3, 2025.

United States Patent and Trademark Office; Office Action received in U.S. Appl. No. 19/083,837, mailed Jun. 26, 2025.

United States Patent and Trademark Office, Office Action received in U.S. Appl. No. 19/083,084, mailed Jun. 17, 2025.

United States Patent and Trademark Office; Final Office Action received in U.S. Appl. No. 19/083,837, mailed Oct. 21, 2025.

* cited by examiner

SYSTEMS AND METHODS FOR ORDERING AND PAYMENT

CROSS-REFERENCE TO RELATED APPLICATIONS

This application is a continuation of U.S. patent application Ser. No. 17/886,437 filed on Aug. 11, 2022 and entitled "SYSTEMS AND METHODS FOR ORDERING AND PAYMENT," which is a continuation of U.S. patent application Ser. No. 17/006,494 filed on Aug. 28, 2020, and entitled "SYSTEMS AND METHODS FOR PRODUCT ORDERING AND PAYMENT," which is a continuation of U.S. patent application Ser. No. 15/188,740 filed Jun. 21, 2016 and entitled "SYSTEMS AND METHODS FOR PRODUCT ORDERING AND PAYMENT." U.S. Ser. No. 15/188,740 is a continuation of U.S. patent application Ser. No. 15/174,632 filed on Jun. 6, 2016 and entitled "SYSTEMS AND METHODS FOR PRODUCT ORDERING AND PAYMENT." U.S. Ser. No. 15/174,632 claims the benefit of U.S. Provisional Application Ser. No. 62/171,944 filed on Jun. 5, 2015 and entitled "SYSTEM FOR PRODUCT ORDERING AND PAYMENT." The contents of each of the foregoing applications are hereby incorporated herein by reference.

FIELD OF INVENTION

The present disclosure generally relates to product ordering and payment systems. More particularly, exemplary embodiments of the disclosure relate to systems and methods that can be used for remote ordering and payment of goods or services.

BACKGROUND OF THE DISCLOSURE

Many consumers enjoy buying products and services from various merchants, such as restaurants, coffee shops, retailers, wholesalers, manufacturers and other vendors. As used herein, a "consumer" is any person or entity that purchases or otherwise acquires goods or services. A "merchant" or "establishment" is any entity that sells or otherwise provides goods and services. When ordering some items, consumers may arrive at the establishment, select their item or wait to place an order for the item, pay for the item, and then (sometimes) wait to receive the item(s) ordered. Each step in this process is time-consuming and may diminish the experience associated with purchasing the item.

In some cases, consumers order items by telephone or on-line and pay for the item at the establishment or when the item is delivered. In an on-line purchase, a consumer typically goes to a merchant's website, reviews the items that can be purchased, and then places an order. For telephone purchases, the consumer calls and places an order. The consumer then pays for the item over the telephone via credit card or when the item is delivered. These steps can be undesirably time consuming. Additionally, the establishment may produce an order and never receive payment, or payment may be made and the order not received, or not received on time.

Additionally, payment over the internet, by telephone, or at a point of sale terminal at a merchant's location typically requires disclosing confidential information such as the payment card number, owners' name, CVV number, card expiration date, and often the card billing address. The information needed to authenticate a charge makes future fraudulent charges possible. As used herein, "payment card" or "card" means a credit card, debit card, or the like.

Accordingly, improved systems and methods for ordering and paying for item(s) that mitigate wait times at a merchant's establishment and/or that increase a user's satisfaction with a purchasing experience are desired.

SUMMARY OF THE DISCLOSURE

Various embodiments of the present disclosure relate to systems and methods for purchasing one or more items using a user device (also called a "device" herein), which can be a mobile cellular device, such as a cell phone, tablet, personal computer, or the like. A user software application (also called a "user application" or "application" herein) may be loaded on the device or accessible at a remote location by the device. The user application has, or has access to, a memory or database that stores two or more of the date an item(s) was purchased, item(s) purchased or ordered, merchant, merchant location, price paid, current price, other items offered by the merchant, delivery time for the item, time of day, month and/or year prior orders were placed, health information of the user, and information related to an item of food, such as calories, fat content, sugar content, carbohydrate content, whether or not gluten free, and/or other information.

When accessed by the user, the application can determine items previously purchased from one or more merchants, and display merchant(s) and most-frequently, or most recently purchased, items to a user, plus other items offered for sale by the merchant(s). The merchants can be selected as desired, for example from a group of previously-used merchants, from a group of nearby merchants—i.e., merchants that are within a determined distance from the user device, or a group of merchants that belong to a program. The device may display other items that the merchant may be attempting to sell, such as discounted items or holiday specialty items.

Exemplary systems and methods can also be used to easily and/or automatically purchase items. The purchase can be made without the need for a user to order and/or pay at the merchant location.

The user device enables a user to select one or more items to purchase and can facilitate payment to the merchant. The payment can be direct, such as bypassing credit card or other payment information to the merchant through a computer or point of sale device. Or, the payment can be indirect through an intermediate system to avoid exposing the user's personal information to the merchant.

By way of example, an exemplary system includes the user device, a merchant payment device, and a payment issuer. As used herein, a payment issuer is a source of funds, such as a bank, associated with the user's card (e.g., a debit card, credit card, or the like) or bank account. The payment issuer can communicate with the user device and/or the user application. After an order has been placed by the user, the merchant payment device sends a request for payment to the user device or application, which forwards the request to the payment issuer including the card or bank account designated by the user. Systems at the payment issuer verify the transaction, for example by checking the user account number, expiration date, source of the payment request, and available funds, and send a payment verification notification to the merchant system and to the user device. The monetary amount of the transaction is transferred into the merchant's account at the merchant's bank (which is defined as any account designated by the merchant for the receipt of funds).

In this manner, the merchant system never has access to the user's confidential card or bank account information, but still receives payment, and the transaction for the sale of the item is consummated. The user and merchant can each verify the transaction was complete by using the verification notification, which may be a number or any other suitable indicia.

In accordance with yet further exemplary embodiments of the disclosure, the user device can be used to place an order ahead of time when a user is expected to arrive at a merchant location. The user device or application communicates directly with a merchant network or server. Payment can be made at the merchant location, or made indirectly as described above.

Exemplary systems and methods can additionally or alternatively perform other functions. For example, exemplary applications can calculate a time and/or distance between a user and a merchant. The system can know or calculate a time to fulfill an order based on historical data or based on a communication sent from merchant after the order is received.

Systems and methods according to the invention may also, once a merchant is selected, prompt the user to either order the same item as previously purchased, or as purchased most frequently, or both, and/or prompt the user to modify the order or select another item.

Additionally, any system or method according to aspects of the invention may include a database, or access one or more databases, for example associated with the user's health. Available information associated with the user's health may include weight, age, medical conditions (such as diabetes, high blood pressure, heart condition, and/or the like), and/or a diet program. The system may communicate with databases such as the individual's electronic health records, EMR (electronic medical record) and/or PHR (personal health record). The application can match this information with information related to food items, such as the sugar amount, salt amount, vitamin amount, contents, cholesterol amount, fat amount or starch amount available from a merchant and suggest items based on the user's medical condition and other factors, such as time of day.

The system is smart and updates over time depending upon the new information it receives, for example based on system updates, new and/or additional data regarding a user or a merchant, and/or the like. The contents of this summary section are provided as a simplified introduction to the disclosure, and are not intended to be used to limit the scope of the appended claims.

BRIEF DESCRIPTION OF THE DRAWING FIGURES

DETAILED DESCRIPTION OF EXEMPLARY EMBODIMENTS OF THE DISCLOSURE

The detailed description of exemplary embodiments herein makes reference to the accompanying drawing figures, which illustrate various embodiments by way of illustration. While various embodiments are described in sufficient detail to enable those skilled in the art to practice the disclosure, it should be understood that other embodiments may be realized and that logical and functional changes may be made without departing from the spirit and scope of the disclosure. Thus, the detailed description herein is presented for purposes of illustration only and not of limitation. For example, steps recited in a method or process may be executed in any order unless otherwise noted. Moreover, unless otherwise noted, functions or steps may be performed by one or more third parties.

Exemplary embodiments of the disclosure relate to electronic communication systems and methods to facilitate a transaction between a user and a merchant. As set forth in more detail below, various systems and methods employ a user device having an application thereon to perform various functions. For example, the application can retrieve information relating to a merchant, such as most-frequent purchases made by the user at that merchant. The merchant may be part of a franchise, in which case the information may include most-frequent purchase at the franchise, as opposed to at a single merchant of the franchise.

In accordance with some embodiments of the disclosure, a user and/or a merchant can participate in a program which confers certain privileges to its members. In these cases, various functions described below can be provided by a program manager—e.g., via cloud services described below. Such features can eliminate or reduce wait times for a consumer, reduce or eliminate incorrect orders, and eliminate a need to pay for items at a merchant location. Basic functions of the program can be offered to users for free, with additional functions added for a premium. Similarly, basic functions can be provided to merchants, with premium features provided to merchants for a fee. Or, merchants can be required to pay a fee (e.g., monthly or annually) to join the program.

Additionally or alternatively, exemplary systems and methods can provide a process for using a user device to place an order with a merchant and to pay for the order prior to arriving at a merchant location.

Figure 1:
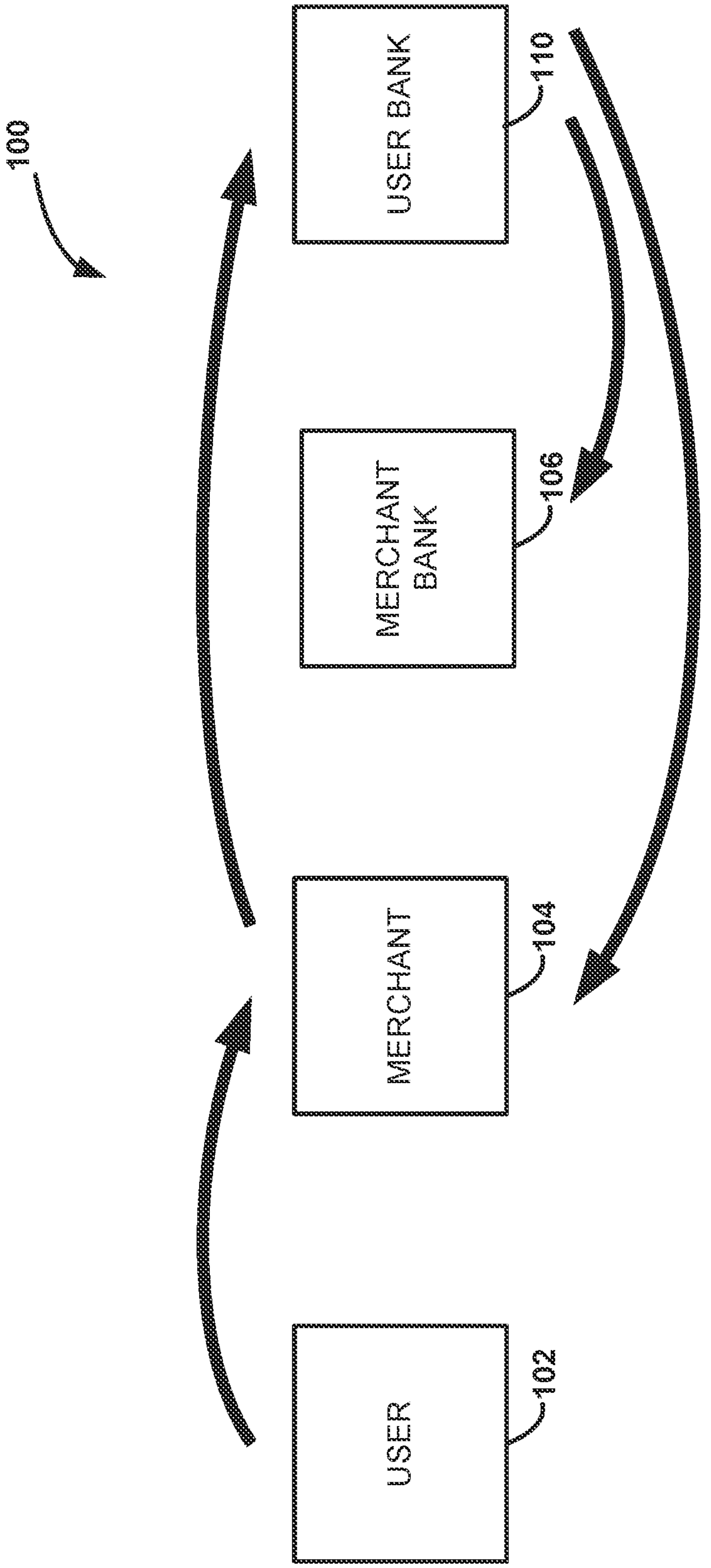
FIG. 1 (PRIOR ART)
FIG. 1 illustrates a financial transaction system as known in the art.

During a typical user/merchant transaction, such as a transaction at a restaurant, coffee shop, or similar merchant, a consumer (user) arrives at a merchant location, orders an item, pays for the item, and then waits to receive the item. FIG. 1 illustrates the typical process. In this case, a user 102 presents payment information (e.g., a credit card or debit card) to a merchant. A merchant device 104 then transmits a request for payment to an acquiring bank 106 (e.g. the merchant's bank). Then, e.g., using a financial network 108, acquiring bank 106 requests payment on behalf of the merchant from an issuing financial institution (e.g., the user's bank). While such systems work relatively well, they require the presence of the user at the merchant site prior to or when paying for the item. Such systems also require the user to spend additional time at the merchant site. In addition, user financial information is generally provided by a user directly to merchant device 104. Providing such financial information may be undesirable, because such information can be misused by a third party. In addition, if the user is paying with a credit or debit card, the user and/or merchant may be susceptible to fraud.

Figure 2:
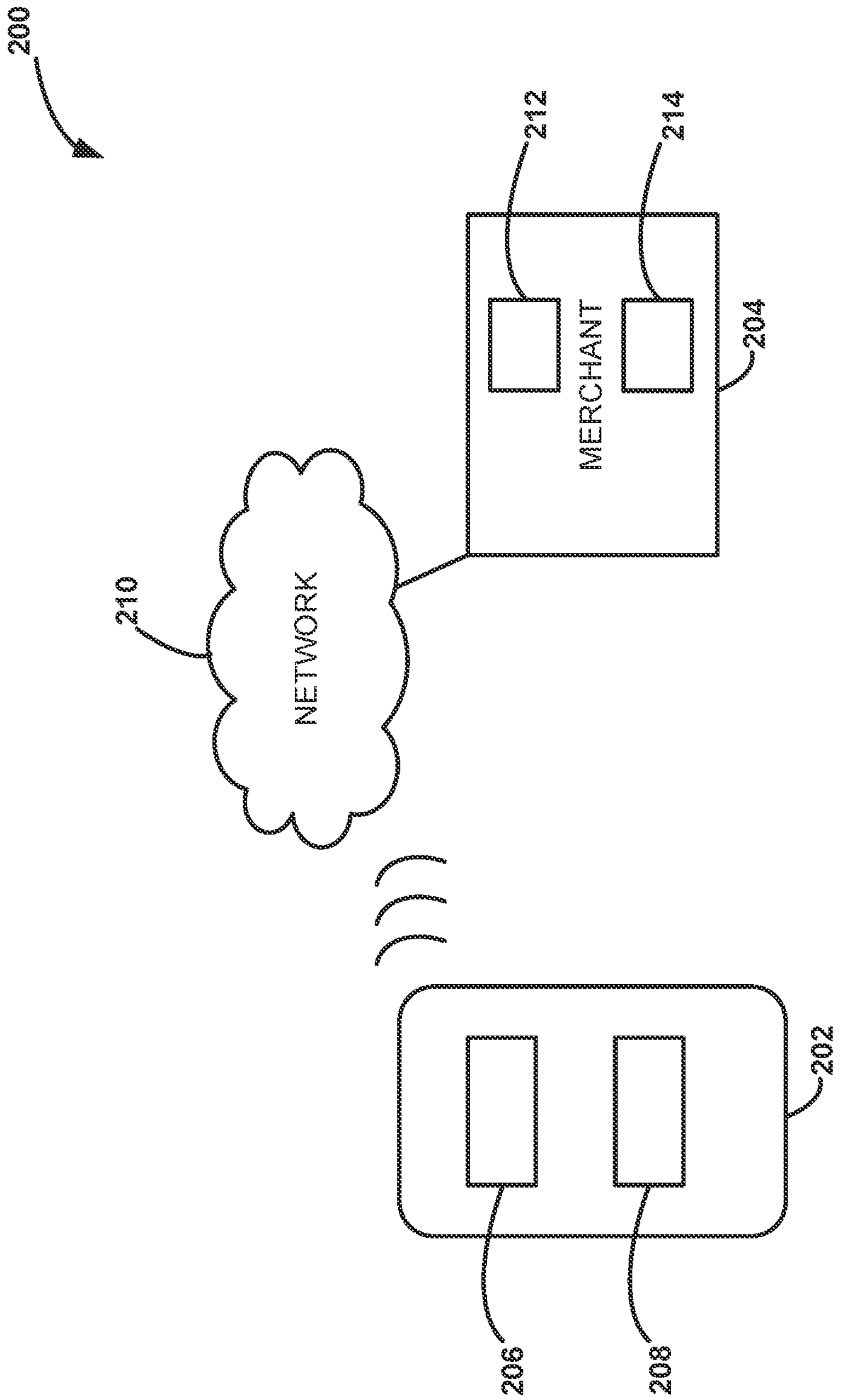
FIG. 2 illustrates an electronic communication and payment system in accordance with exemplary embodiments of the disclosure.

In contrast to these prior approaches, exemplary systems and methods allow for more convenient and/or automated ordering, reduce wait times, provide suggestions for orders, and/or the like. FIG. 2 illustrates an electronic communication and payment system 200 in accordance with various exemplary embodiments of the disclosure. Electronic communication and payment system includes a user device 202 and a merchant device 204. As set forth in more detail below, in accordance with exemplary embodiments of the disclosure, user device 202 can be used to place an order for one or more items—e.g., for later pickup by a user/consumer and can transmit payment (e.g., by way of a credit card payment, debit card payment, token, credit, or the like) to merchant device 204. Communication between user device and merchant device can be direct or be transmitted through a network 210. Additionally, or alternatively, the payment can proceed without involvement of other financial institutions, as illustrated in FIG. 2, or may go through one or more intermediary financial institutions, as discussed in more detail below in connection with other figures.

User device 202 can comprise any suitable device with wireless communication features or that can communicate over a network. In the illustrated examples, user device 202 is illustrated using mobile, cellular, satellite, and/or wireless communication. However, the disclosure is not so limited. By way of examples, user device 202 can include a computing unit or system. The computing units or systems may take the form of a computer, a set of computers, a smartphone, a laptop (for example, a MacBook), a notebook, a tablet (for example, an iPad), a hand held computer, a personal digital assistant, a set-top box, a workstation, a computer-server, a main frame computer, a mini-computer, a PC server, a pervasive computer, a network set of computers, a personal computer, a kiosk, a point of sale (POS) device and/or a terminal, a television, or any other device capable of receiving and/or sending data over a network. User device 202 may run Microsoft Internet Explorer®, Mozilla Firefox®, Google® Chrome, Apple® Safari, Apple® IOS, Android, or any other suitable software package(s). In accordance with various embodiments of the disclosure, device 202 is global positioning system (GPS) enabled in order to provide and/or utilize location information associated with device 202. For example, device 202 may be configured to support geo-location and/or location-based services.

In accordance with various embodiments of the disclosure, user device 202 includes an application 206 to perform one or more functions as described herein. In accordance with various aspects of these embodiments, application 206 uses GPS-enabled features of device 202 to allow device 202 to perform certain functions based on, for example, a distance between a user (with user device 202) and a merchant (with merchant device 204), an expected amount of time it will take a user to reach the merchant (which can depend on one or more modes of transportation, such as walking, driving, public transportation, or combinations thereof). For example, as discussed in more detail below, a user can use user device 202 and application 206 to place an order, wherein the order will be transmitted to a merchant (either directly or through various networks) based on a user proximity to the merchant, an expected time for a user to reach a merchant, or the like.

A consumer can use user device 202 and application 206 to cause various functions to be performed. As used herein, the terms "consumer," "user," "end user," and "customer" may be used interchangeably with each other, and each may include any person, entity, government organization, business, machine, hardware, and/or software. Application 206 can be a stand-alone application, part of an operating system, or a web plug-in. In any of these cases, user device 202 can act as a web client that communicates via a network (e.g., network 210). Web clients may include a browser application which interfaces with a network. Such browser applications typically include internet browsing software installed within a computing unit or a system to conduct online transactions and/or communications.

During a transaction, a user can use user device 202 to review nearby merchants (e.g., based on GPS coordinates) and review recent orders placed with such nearby merchants. The recent order(s) can be displayed as a default (or only) order option. A default option can be, for example, the most recent order, a most-frequent order (e.g., the most frequent from the last 2 or more orders), a most popular order based on transaction data for a merchant, and/or the like. A price can be displayed proximate the item, and an option to buy one or more items can be displayed to the user.

In accordance with some exemplary embodiments of the disclosure, application 206 can be enabled to be continuously running in the background, so that when a user is within a predetermined distance (e.g., 5 miles, 2 miles, 1 mile, 0.5 mile, or the like) from a predefined merchant (e.g., a merchant participating in a program), application 206 automatically displays a user interface, such as one or more user interfaces discussed in more detail below in connections with FIGS. 7-9. The amount of distance or time can be user selected or merchant selected and can be based on, for example, a mode of transportation used by the user and/or an average speed that the user is traveling.

By way of one example, application 206 can be used to calculate where the customer is located relative to a drive-through restaurant or facilities thereof, so as to engage the user at the appropriate time. At the start of the drive-through (i.e., as the user approaches and/or enters the drive-through area of a restaurant) the user is prompted by application 206 as to whether the user wants the same order as a previous order, a most-frequent order item, or the like. At the speaker the user is asked to pull forward, because the order is already in the system. Prior to or at a payment window, the application 206 provides a display requesting payment prior to or after receiving the user's order.

Another example is just-in-time ordering as noted above. In this case, device 202 or 204 or another device, such as a device provided by a cloud service, discussed in more detail below, calculates how far (or how much time) a customer is away from a given location after ordering, and places the order with merchant device 204 after calculating the preparation and any additional time, before the customer arrives at the merchant site. In accordance with some embodiments, a customer can have an option presented on user device 202 to "prepare now," in which case the order is placed in the merchant queue and is processed in order (or with preference to those in the program).

Application 206 can optionally include an option to "pay it forward" and/or "pay it backward." Something trending in coffee lines is the concept of paying for the car ahead of you (e.g., when you are at the speaker) or the car behind you when you are at the pickup window. A user can push a button using application 206 on user device 202 to do either and this can be based on, for example, user device's communications to merchant device 204—either directly or via a cloud service. For privacy reasons, the order of the other person may not be shown to the user paying for such items.

In accordance with additional exemplary embodiments of the disclosure, application 206 can be used to review (e.g., real-time) wait times associated with particular merchants. For example, in the case of restaurants, application 206 can be used to look at restaurants (e.g., restaurants enlisted in a program) in the area to see how long their wait list is. The restaurants can be displayed to a user in certain areas by, for example, choice of food, location, and/or wait times. After receiving such information, users can use the ability to push up on the line with the put me in line feature, for example, as discussed below.

In accordance with yet further additional or alternative embodiments, application 206 and user device 202 can be used in connection with pull-up services. In these cases, a merchant can dedicate an area and/or parking spots to users participating in a program. In these cases, a user does not need to go through a drive through or wait in line. Rather, application 206 and/or a cloud service can send an alert to the merchant (e.g., merchant device 204) when a user is near or at the merchant location. A user may come in to get the order or to have it brought to their car. The establishment setup may record the location of the reserved parking spots.

User device 202 can also include a database 208. Database 208 can store information relating to various merchants and can store user order information associated with the merchants. Although illustrated as part of user device 202, database 208 or portions thereof can suitably form part of (and/or be accessed or accessible via) network 210 or another network. Database 208, in accordance with exemplary embodiments of the present disclosure can be implemented as a database management system (DBMS), a relational database management system (e.g., DB2, Oracle, SQL Server, My SQL, ACCESS, etc.), an object-oriented database management system (ODBMS), a file system, or in any another suitable manner. Database 208 can be accessed by a server via a Structure Query Language (SQL) or in any other desired manner. Database 208 may be organized in any suitable manner, including as data tables or lookup tables. Association of certain data may be accomplished through any desired data association technique and data association may be accomplished manually and/or automatically. In one embodiment, database 208 is configured to store information related to a service performed for a customer. Information from database 208 can be used by application 206 to, for example, facilitate performance of various functions described herein.

Database 208 can also store user account information. Phrases and terms similar to "account," "account number," "account code" or "consumer account" as used herein, can include any device, code (e.g., one or more of an authorization/access code, personal identification number ("PIN"), internet code, other identification code, and/or the like), number, letter, symbol, digital certificate, smart chip, digital signal, analog signal, biometric or other identifier/indicia suitably configured to allow the consumer to access, interact with or communicate with the system. In various embodiments, an account number can refer to a fifteen or sixteen digit number on a transaction instrument and a card security code on the transaction instrument. The account number may optionally be located on or associated with a rewards account, charge account, credit account, debit account, prepaid account, telephone card, embossed card, smart card, magnetic stripe card, bar code card, transponder, radio frequency card or an associated account.

Merchant device 204 can include any suitable system, software, and/or hardware, such as devices noted above in connection with user device 202. A merchant can be a provider, broker and/or any other entity in the distribution chain of items. A merchant can be, for example, a coffee shop, a restaurant, a bookstore, a grocery store, a retail store, a travel agency, a service provider, a social media operator, an on-line merchant, a digital wallet provider, or the like. Phrases and terms similar to "business" or "merchant" may be used herein interchangeably with each other.

Merchant device 204 can include a merchant application 212. Merchant application 212 can facilitate communication between merchant device 204 and user device 202 and/or can facilitate setup of merchant device 204 to be used in accordance with exemplary embodiments of the disclosure. For example, merchant application can be used to receive an order and/or indication of a payment from a customer and, in some cases, can transmit a verification of receipt of payment to user device 202 or to another entity. Merchant application 212 can also allow a merchant to input information regarding the merchant, such as merchant account information, location of merchant, and/or GPS coordinates for locations associated with the merchant (e.g., GPS coordinates of a drive-up window, a pickup window, a payment window, a pickup location, and the like). Additionally or alternatively, merchant application 212 can allow a merchant to enter expected wait times associated with various items. The expected wait times can include preparation time and additional time, which can be entered or calculated using, e.g., one or more of the devices described herein. The additional time can include, for example, additional time associated with a user traveling to the merchant site, additional time associated with additional customers at a merchant site, a time of day, a time of year, and the like.

By way of example, merchant application 212 can prompt a merchant to mark a start of their drive-through where the GPS location will be recorded, stepping at a suitable interval (for example, approximately every 10 feet), then marking the GPS location for a speaker, and then marking a GPS location for a serving window. This allows quick setup of merchant application 212 to get a merchant online quickly. Such information can be used to calculate where in line the user is at in order to pop up the appropriate user interface when the user is close to the merchant. Such information can be stored on merchant device 204 and/or on part of a network or cloud service discussed below.

Merchant device 204 can also include a database 214. Database 214 can be used to store payment information, such as customer name, order, and indication of payment received. Database 214 can include the same system and/or software described above in connection with database 208, or may differ from database 208, as desired.

Network 210 can include a local area network (LAN), a wide area network, a personal area network, a campus area network, a metropolitan area network, a global area network, a financial network, the internet, or the like. Network 210 can be coupled to one or more user devices 202, merchant devices 204, and/or other devices using an Ethernet connection, other wired connections, wireless interfaces, such as Bluetooth, Wifi, or mobile communication protocols, such as wireless application protocol (WAP), or the like. Network 210 can be coupled to other networks and/or to other devices.

Network 210 may comprise any suitable electronic communications systems or methods which incorporate software and/or hardware components. Communication may be accomplished through any suitable communication channels, such as, for example, a telephone network, an extranet, an intranet, the internet, point of interaction device (point of sale device, personal digital assistant, smart phone, cellular phone (e.g., iPhone®, Windows Phone®, Android, or Blackberry®), kiosk, etc.), online communications, satellite communications, off-line communications, wireless communications, transponder communications, local area network (LAN), wide area network (WAN), virtual private network (VPN), networked or linked devices, keyboard, mouse and/or any suitable communication, data input modality, and any combinations thereof. Network 210 may be implemented with TCP/IP communications protocols and/or using IPX, Appletalk, IP-6, NetBIOS, OSI, any tunneling protocol (e.g., IPsec, SSH), or any number of suitable existing or future protocols. If network 210 is in the nature of a public network, such as the internet, it may be advantageous to presume the network 210 to be insecure and open to eavesdroppers. Specific information related to the protocols, standards, and application software utilized in connection with the internet is generally known and, as such, need not be detailed herein.

The various system components described herein can be independently, separately or collectively coupled to network 210 via one or more data links including, for example, a connection to an Internet Service Provider (ISP) over a local loop as is typically used in connection with standard modem communication, cable modem, Dish networks, ISDN, Digital Subscriber Line (DSL), or various wireless communication methods. The systems and methods disclosed herein contemplate the use, sale and/or distribution of any goods, services or information over any network having functionality similar to that described above with reference to network 210.

Figure 3:
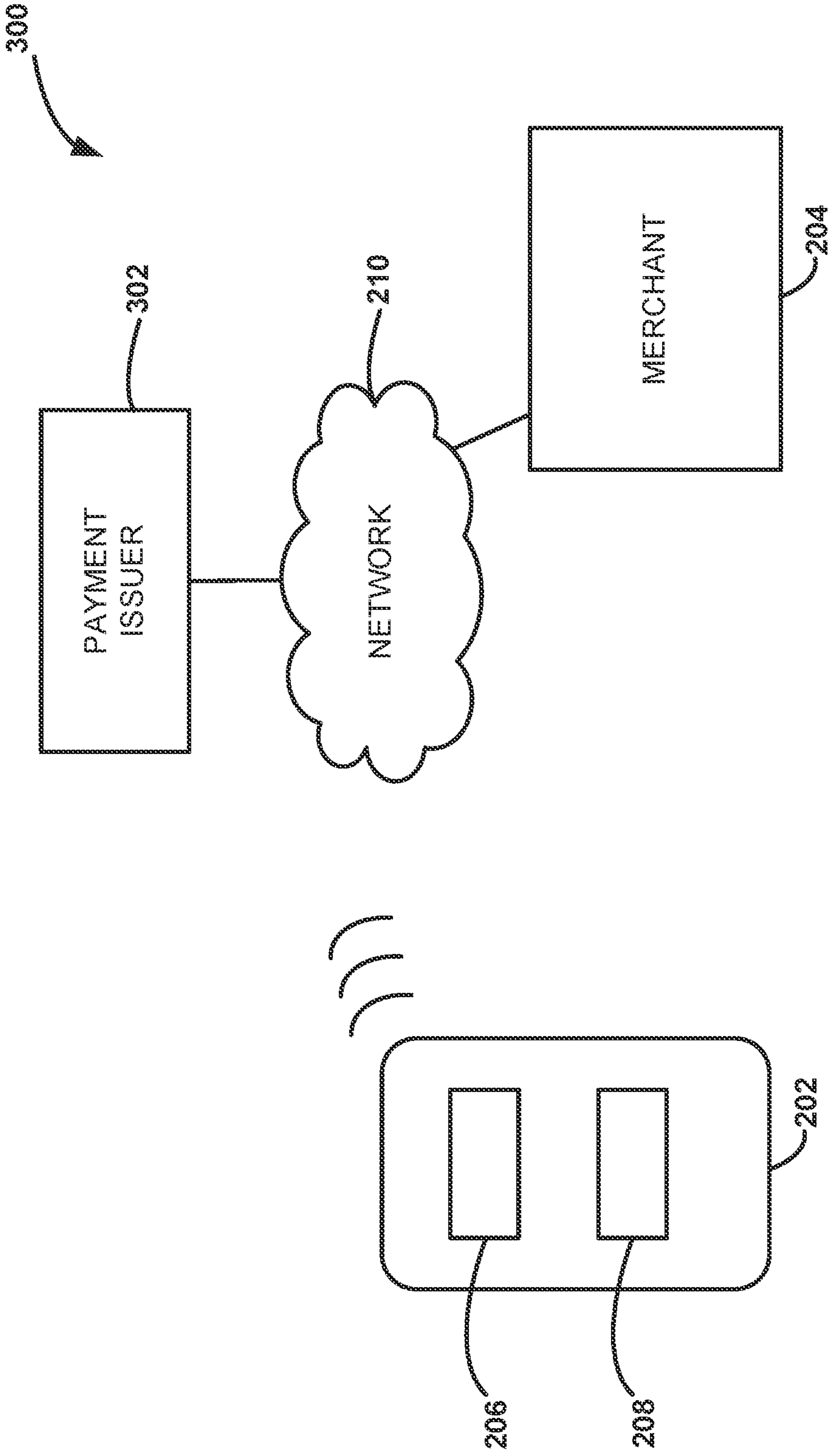
FIG. 3 illustrates another exemplary electronic communication and payment system in accordance with embodiments of the disclosure.

FIG. 3 illustrates another exemplary electronic communication and payment system in accordance with additional exemplary embodiments of the disclosure. System 300 is similar to system 200, except system 300 includes a payment issuer 302.

Payment issuer 302 can be any entity that offers transaction account services, such as a financial institution. The financial institution can represent any type of bank, lender or other type of account-issuing institution, such as credit card companies, card-sponsoring companies, or third-party issuers under contract with financial institutions. It is further noted that other participants may be involved in some phases of the transaction, such as an intermediary settlement institution.

Payment issuer 302 can include a company (e.g., a third party) appointed (e.g., by a merchant) to handle transactions for merchant banks. In accordance with some exemplary embodiments of the disclosure, payment issuer 302 can be broken down into two types: front-end and back-end. A front-end payment issuer 302 can have connections to various transaction accounts and supply authorization and settlement services to the merchant banks' merchants. A back-end payment issuer 302 accepts settlements from front-end processors and, via the Federal Reserve bank, move money from an issuing bank to the merchant bank. In an operation that will usually take a few seconds, the payment issuer can both check the details received by forwarding the details to the respective account's issuing bank or card association for verification, and may carry out a series of anti-fraud measures against the transaction. Additional parameters, including the account's country of issue and its previous payment history, may be used to gauge the probability of the transaction being approved. In response to the payment issuer receiving confirmation that the transaction account details have been verified, the information may be relayed back to the merchant and/or the user. In response to the verification being denied, the payment issuer can relay corresponding information to the merchant and/or the user.

As used herein, "transmit" may include sending electronic data from one system component to another over a network connection. Additionally, as used herein, "data" may include encompassing information such as commands, queries, files, data for storage, and the like in digital or any other form.

To conduct a transaction using electronic communication and payment system 300, a user can select a merchant and item(s) using application 206 and database 208. A user can then select to pay for the items using application 206. The payment information for the transaction can be stored in database 208 and can include one or more payment options. Once the user selects payment, the payment request is transmitted to payment issuer 302—e.g., using network 210. Once payment issuer 302 receives the payment request, payment issuer 302 can send indication of payment, payment, or a token to merchant device 204. Payment issuer 302 and/or merchant device 204 can send user device 202 verification of payment, which a user can present to a merchant upon pickup of the ordered item(s).

Figure 4:
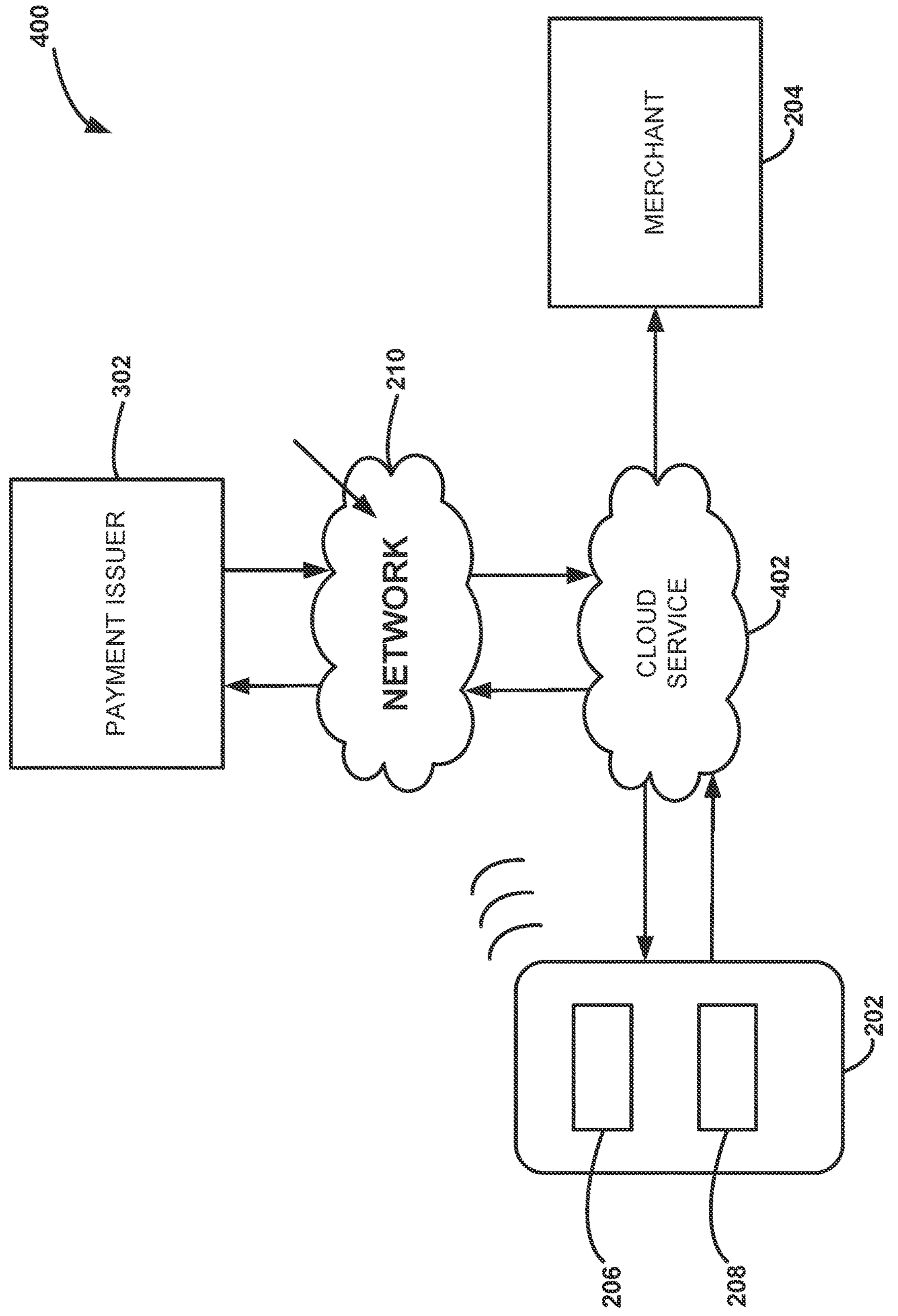
FIG. 4 illustrates another exemplary electronic communication and payment system in accordance with various embodiments of the disclosure.

FIG. 4 illustrates another electronic communication and payment system 400 in accordance with further exemplary embodiments of the disclosure. Electronic communication and payment system 400 is similar to electronic communication and payment system 300, except electronic communication and payment system 400 includes a cloud service 402.

Cloud service 402 can include one or more servers or other device capable of performing exemplary cloud service functions. In various exemplary embodiments, cloud service 402 can include any of the network components described above in connection with network 210. Further, although illustrated separately, cloud service 402 may form part of network 210.

In accordance with exemplary embodiments of the disclosure, cloud service 402 can facilitate user and merchant account setup and/or can store information, such as account information, associated with merchants and/or users. In accordance with further examples, cloud service 402 can additionally or alternatively act as a payment intermediary, such that user account information is not passed to merchant device 204.

For example, cloud service 402 can receive and store merchant information received from merchant device 204. A merchant can enter merchant information, such as location (e.g., address and/or GPS location), menu items, specials, and prices. The merchant information can include specific information, such as GPS locations of drive-up windows, payment windows, and the like.

Similarly, cloud service 402 can receive and store user information, such as one or more of: a user device identifier, merchants, related items (e.g., for each of one or more merchants), payment information (e.g., credit card, debit card, third-party service such as PayPal, or the like). Alternatively, some, including any combination, of such information can be stored on user device 202—e.g., in database 208.

In the illustrated example, when a user places an order using user device 202, cloud service 402 receives the order, and passes a payment request to payment issuer 302—e.g., through network 210. Payment issuer 302 then issues a payment to cloud service 402. The payment can reside with cloud service 402 for a prescribed period of time or until a merchant requests such information. Alternatively, the payment or a corresponding credit can be pushed to merchant device 204. In accordance with some embodiments of the disclosure, the payment information provided by cloud service 402 to merchant device 204 can be in the form of a token or credit, such that user account information and/or payment issuer account information is never passed to merchant device 204. Once merchant device 204 or cloud service 402 receives payment, verification of the payment to user device 202 can be transmitted—either directly from merchant device 204, via cloud service 402 (which can then store such verification), or via another network.

Figure 5:
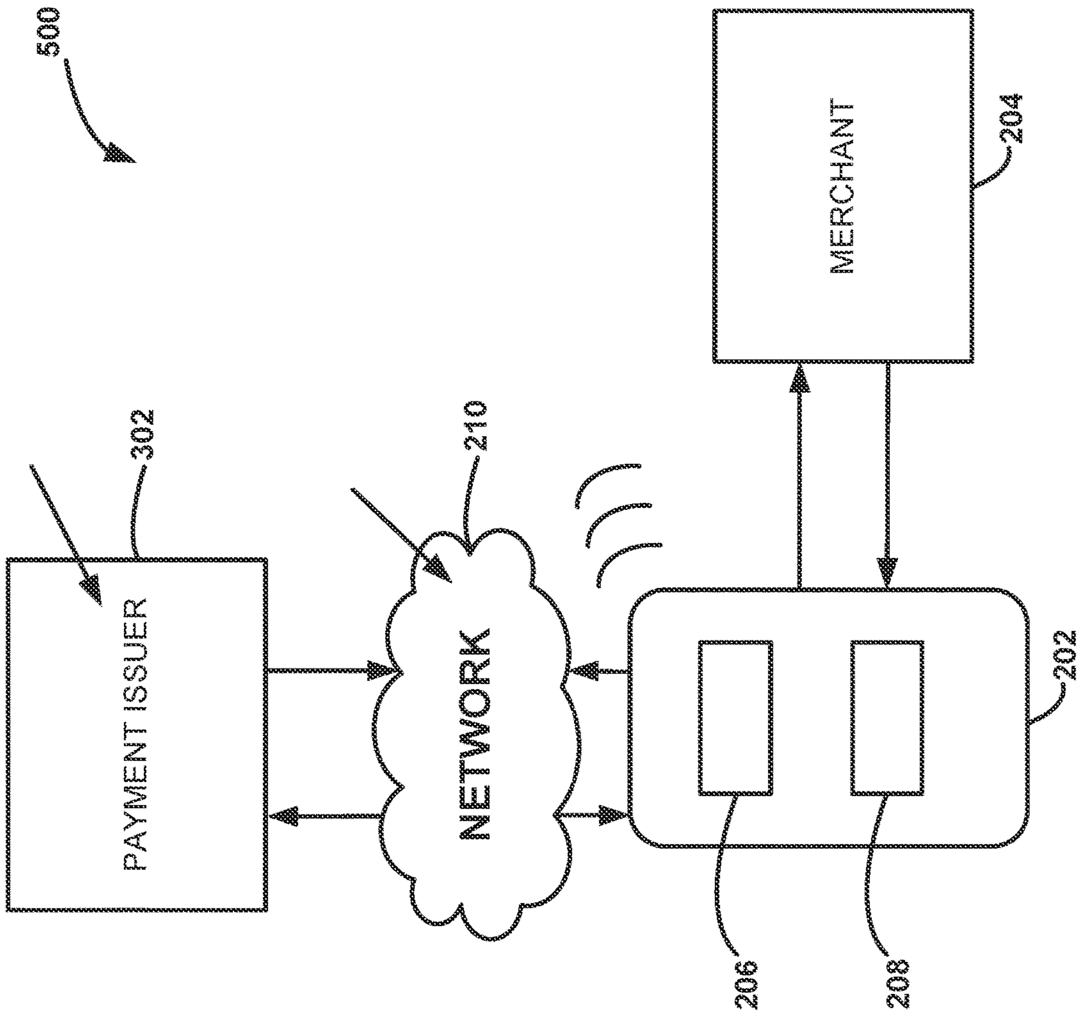
FIG. 5 illustrates another exemplary electronic communication and payment system in accordance with various embodiments of the disclosure.

FIG. 5 illustrates another electronic communication and payment system 500 in accordance with yet further exemplary embodiments of the disclosure. Electronic communication and payment system 500 is similar to electronic communication and payment system 400, except in the illustrated example of electronic communication and payment system 500, payment information from payment issuer 302 is passed through one or more networks 210 (which may include a cloud service 402 as described above) to user device 202. In this case, merchant information and/or user information can be stored in a cloud service, such as cloud service 402. When an order is placed using user device 202, a payment request is transmitted using network 210 to payment issuer 302. Payment issuer 302 then transmits a form of payment to user device 202 via network 210. User device 202 then transmits a payment (e.g., token, or credit) to merchant device 204. Although illustrated as a direct payment, the payment from user device 202 to merchant 204 can go through a suitable network. In accordance with some examples, merchant device 204 can send to user device 202 a verification of payment, which a user can then present to a merchant when picking up the ordered items.

Figure 6:
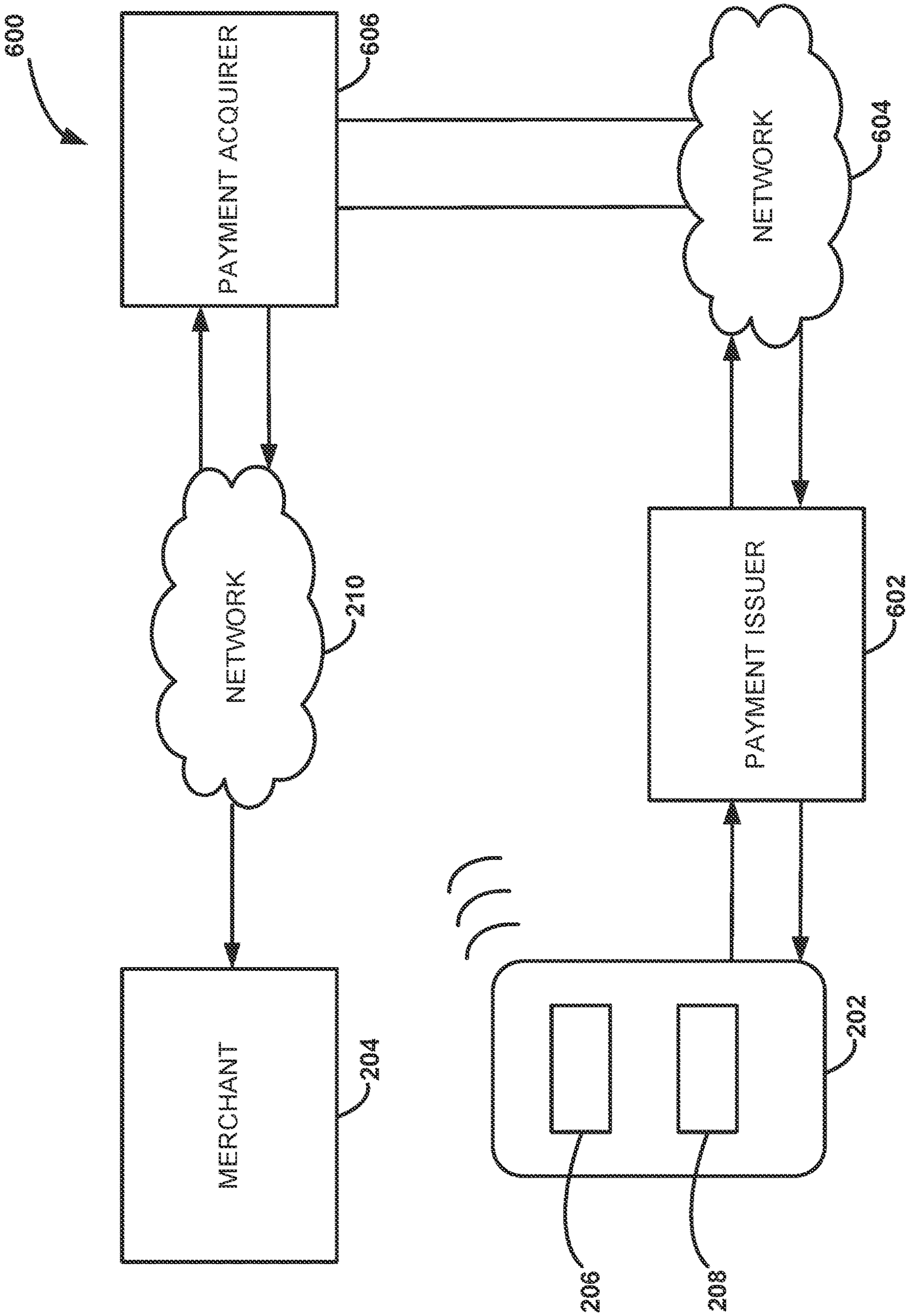
FIG. 6 illustrates a further exemplary electronic communication and payment system in accordance with various embodiments of the disclosure.

Turning now to FIG. 6, another electronic communication and payment system 600, in accordance with additional exemplary embodiments of the disclosure, is illustrated. Electronic communication and payment system 600 is similar to electronic communication and payment system 400, except electronic communication and payment system 600 utilizes a payment issuer 602, a network 604, and a payment acquirer 606.

Payment issuer 602 can be the same as or similar to payment issuer 302. Network 604 can include any of the network components described above in connection with network 210. By way of example, network 604 can include a bank or financial network.

Payment acquirer 606 can include any suitable financial institution, such as those described herein. In the illustrated example, a merchant using merchant device 204 can have a merchant account with payment acquirer 606.

In an illustrated example, when a user places an order to a merchant using user device 202, the order can be received via network 210 (which can be or include cloud service 402, as described above). Information regarding the order, such as a payment request, can then be transmitted to payment acquirer 606 and to payment issuer 602—e.g., via network 604. Order information can then be transmitted to merchant device 204 using network 210. Payment issuer 602 then transmits payment to payment acquirer 606 via network 604. Once payment is received by payment acquirer 606, a notification of receipt of payment can be sent to merchant device 204, so that the merchant receives an indication of the payment. Similar to other embodiments described above, in accordance with some examples of the disclosure, the indication of payment from payment acquirer 606 and/or network 210 to merchant device 204 does not include user account information, so that the merchant does not receive such information. Thus, any fraud on the user that originates at a merchant site or with merchant device 204 can be mitigated or eliminated.

In accordance with some exemplary embodiments of the disclosure, network 210 (e.g., a cloud service) can send verification of payment to user device 202. Additionally or alternatively, merchant device 204 can transmit a verification of payment to user device 202. Such verification can be displayed on user device 202 (e.g., using application 206) when picking up the ordered item(s) from the merchant.

Figure 7:
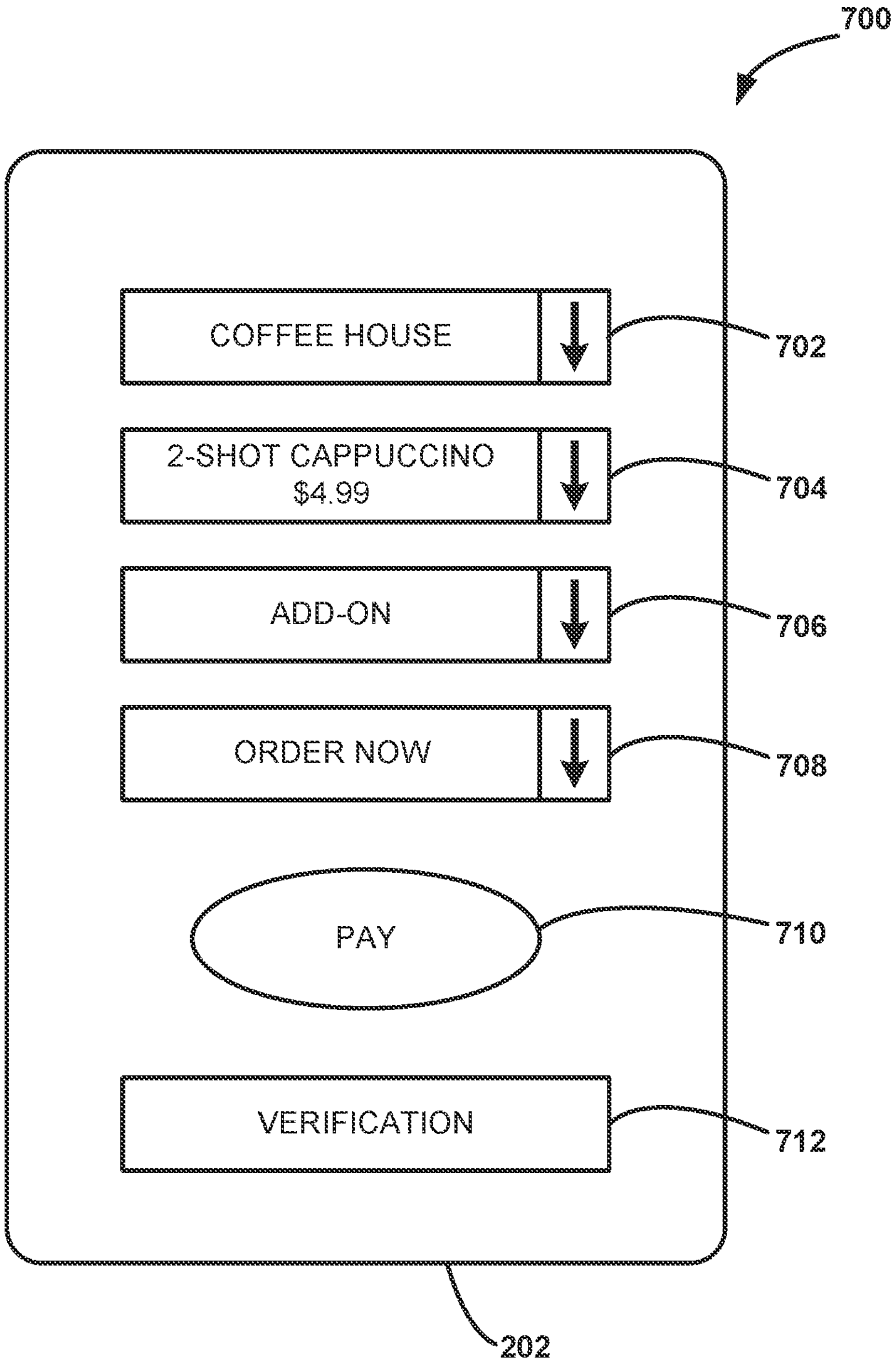
FIG. 7 illustrates an exemplary user interface on a user device in accordance with exemplary embodiments of the disclosure.
Figure 8:
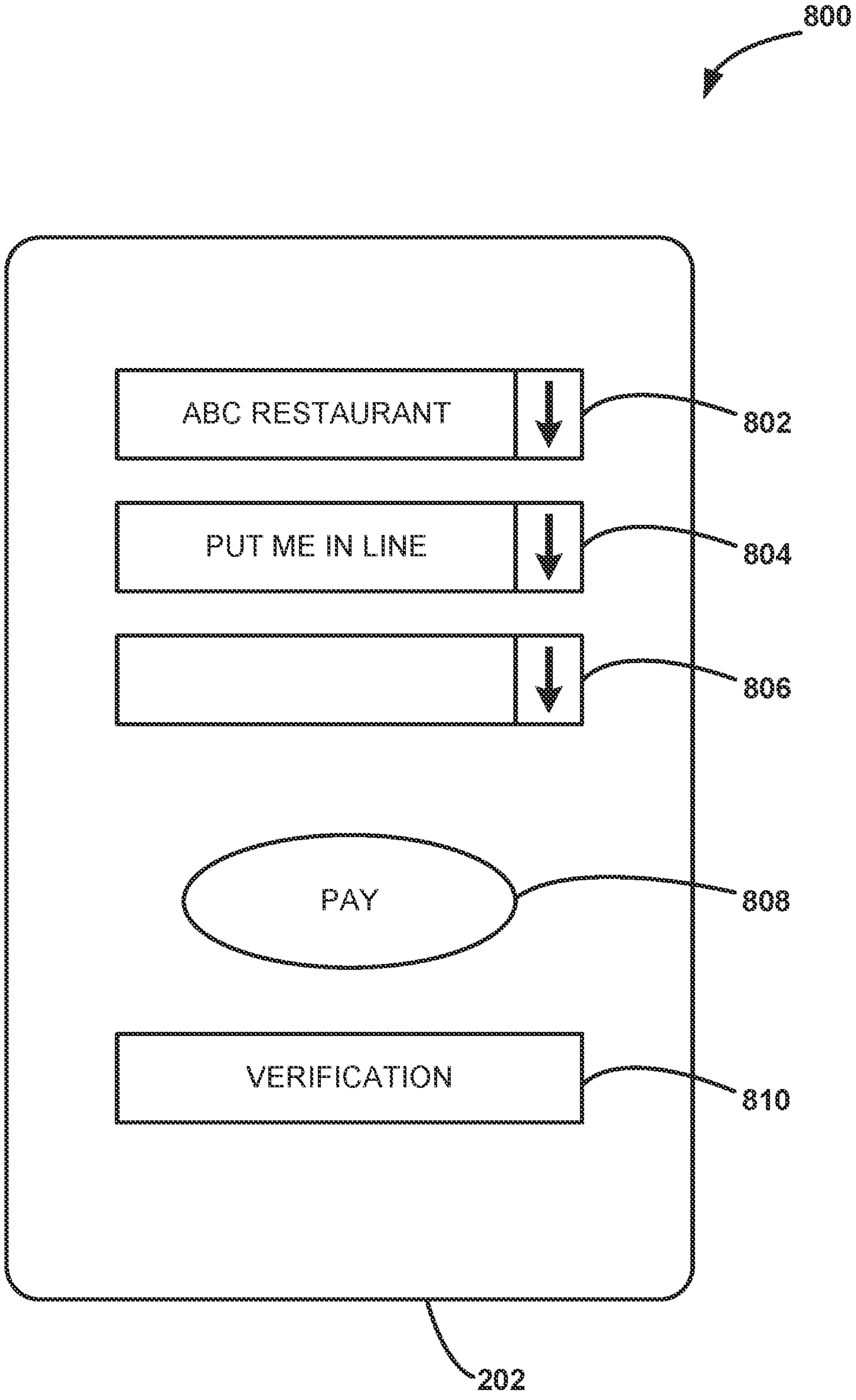
FIG. 8 illustrates another exemplary user interface on a user device in accordance with exemplary embodiments of the disclosure.
Figure 9:
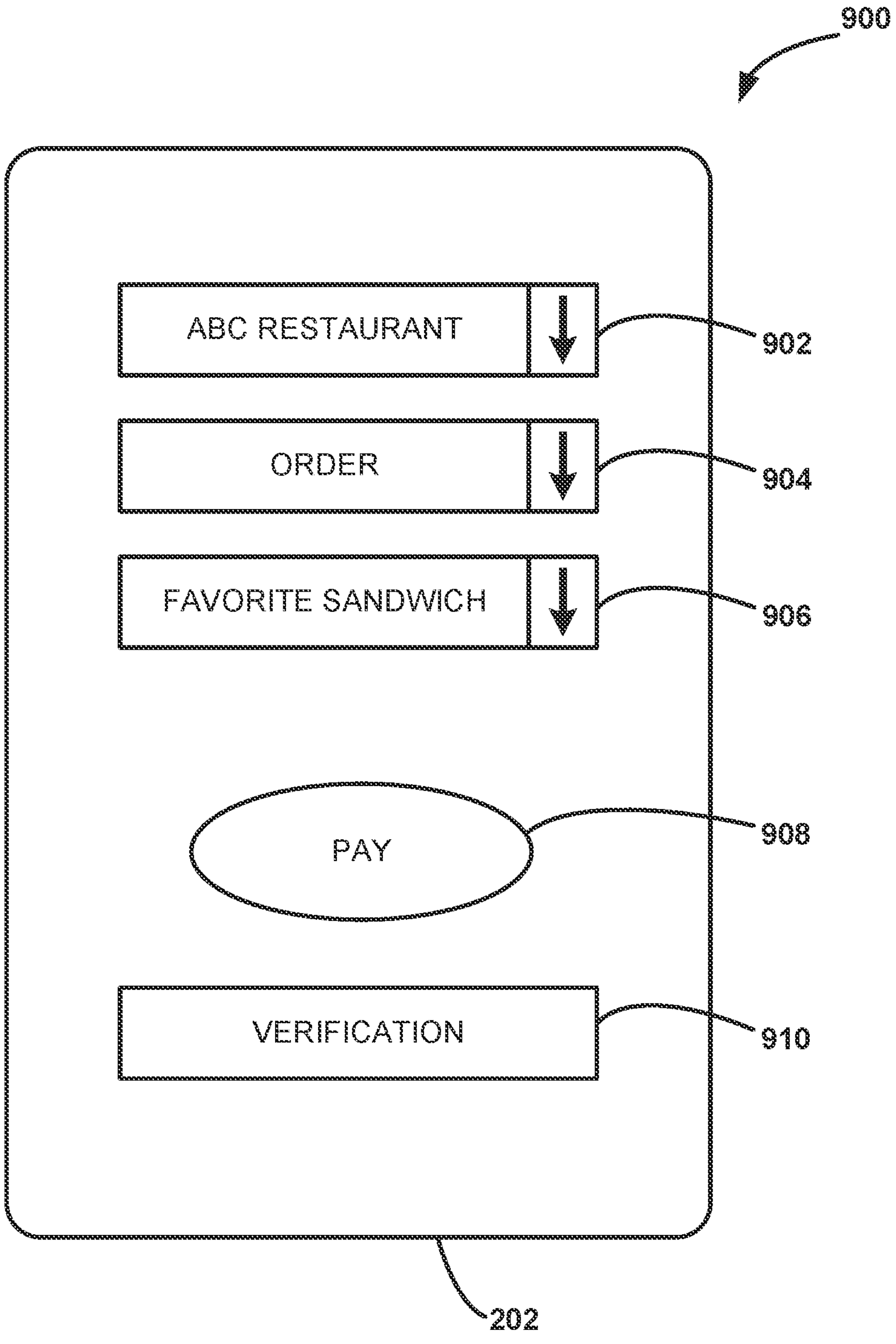
FIG. 9 illustrates another exemplary user interface on a user device in accordance with exemplary embodiments of the disclosure.
Figure 10:
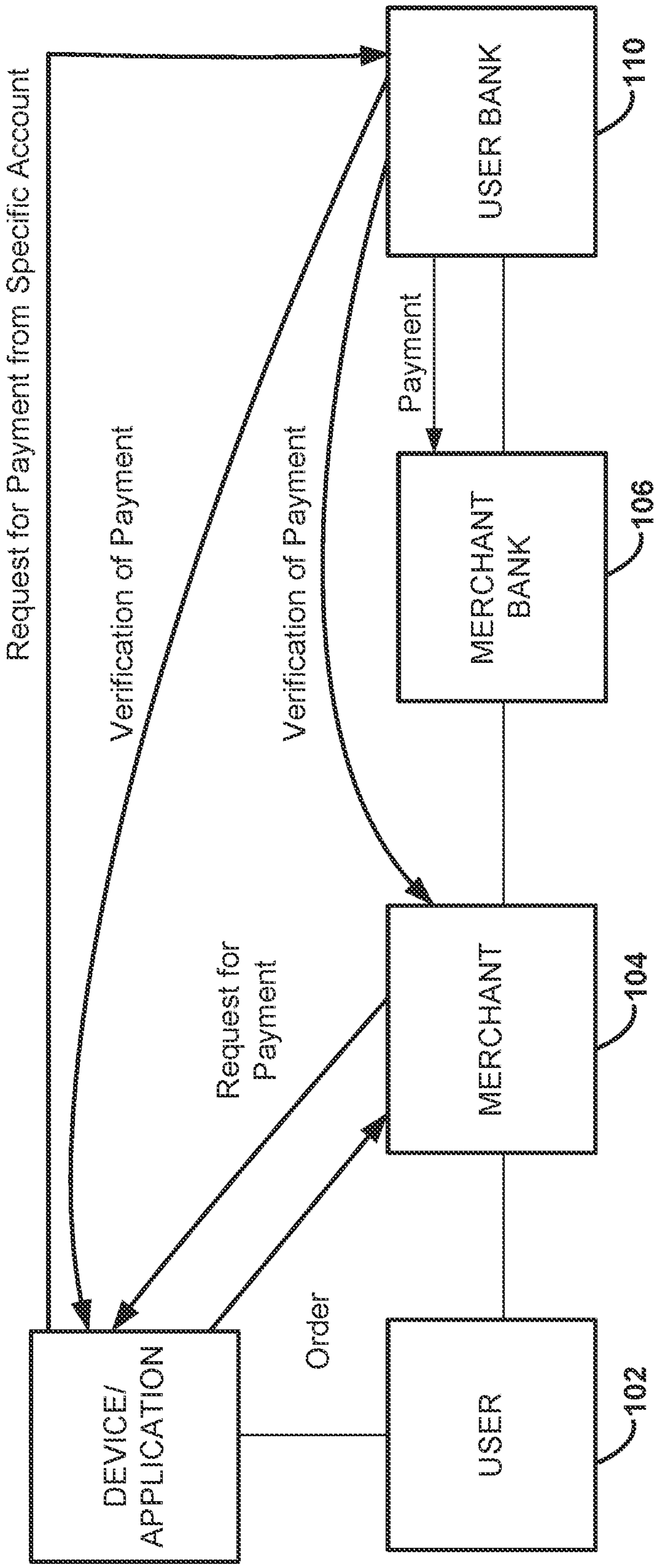
FIG. 10 illustrates a device and method for indirect payment to a merchant.

Turning now to FIGS. 7-9, various functions of user device 202 and user application 206 are described in connection with exemplary user interfaces. The illustrated user interfaces can be used in accordance with any of the exemplary electronic communication and payment systems described above.

FIG. 7 illustrates a user interface 700 in accordance with various examples of the disclosure. In the illustrated example, user interface 700 includes a display 702 to display information associated with a merchant. Display 702 can be configured to display information associated with only a particular merchant, to display a default merchant and have a drop-down or other selection box (as illustrated), or display information associated with multiple merchants. In accordance with various aspects of these embodiments, display 702 and/or user application 206 allows a user to enter or select a merchant.

Display 704 allows a user to select one or more items associated with a selected (or default or only) merchant. As noted above, to provide an improved user experience, application 206 can be configured to automatically display a most-frequently purchased item by a user on display 704. If a user desires to order another item, a user can use selection box 704 to order an alternative item from the merchant.

Display 706 allows a user to select one or more additional items to add to an order. Application 206 can cause to be displayed additional displays 706 if a user selects one or more add-on items.

Application 206 can allow a user to select from various ordering options, such as ordering now, ordering when within a distance or time from a merchant, ordering when within a distance or time of the merchant that is about the same as an estimated time to prepare the item(s) for pickup, or the like. For example, a predetermined amount of time to prepare an item, which can be based on, for example, an average amount of time to prepare the item, can be used to estimate an amount of time to prepare an ordered/selected item. In addition to a preparation time, an estimated time can be based on, for example, a time of day, a number of people in line, an additional amount of time supplied by a merchant, a time of year, an additional amount of time based on, for example, a special event, or the like. Application 206 can be configured to place the order (e.g., as a selected option) when a time for user device 202 to arrive at the merchant is about the same as an estimated time to prepare the item.

A user can select pay option 710 to pay for the ordered item(s). When payment option 710 is selected, payment information previously stored in database 208 can be used to pay for the selected items. If no prior payment information is stored in database 208, then a user can be prompted to enter payment information and such information can be stored in database 208. The user can be prompted whether or not to store the payment information.

Display 712 can pop up once payment verification is received by a merchant device (e.g., merchant device 204), a payment issuer (e.g., payment issuer 302), and/or a cloud service (e.g., cloud service 402). A user can show a merchant the verification as evidence that a payment for one or more items was made.

FIG. 8 illustrates another user interface 800 for additional or alternative functions of user device 202 and/or exemplary electronic communication and payment systems, such as those described herein. User interface 800 is similar to user interface 700, but user interface 800 does not include an option for add-on items. In addition, interface 800 includes a window 804 that allows a user to select a function, such as order, get in line, pay it forward, pay it backward, pay now, or the like. Displays 802, 806, 808, and 810 can be the same as or similar to displays 702, 704, 710, and 712. Display 806 options can depend on the function selected with display 804.

In the example illustrated in FIG. 8, device 202 can be used to place a customer in a queue by selecting "put me in line." For example, if a merchant typically has a long waiting line, a user can use user device 202 and application 206 to communicate with the merchant—e.g., using merchant device 204 to indicate that the user desires to be in a queue.

By way of example, a user can be put on a wait list from a remote location using user device 202. The list can be adjusted (the user moving down the list) if the user's arrival time (e.g., based on the user's device's GPS location) is less than X (e.g., 30, 20, 10, 5, or the like) minutes away from the merchant or moved up on a list if the user is more than x minutes away from the merchant.

In accordance with some exemplary embodiments, a user's device (e.g. user device 202) can be used in a manner similar to a pager. Many restaurants use a pager that is given to patrons to signal the customers when their tables are ready. In accordance with some embodiments of the disclosure, merchant device 204 can transmit a signal to user device 202—either directly or indirectly—to notify the user that the table (or item) is ready. A pop-up, message, vibration, or other suitable technique may be utilized to inform the user, as desired.

FIG. 9 illustrates another user interface 900 that can be used for, for example, a pull-up service. User interface 900 is similar to user interface 700, but user interface 900 is simplified and does not include an option for add-ons (but in other examples a user interface may include such a display) or alternative payment options. In addition, user interface 900 includes a window 904 that allows a user to select a function, such as order now, get in line, pay it forward, or the like. Displays 902, 906, 908, and 910 can be the same as or similar to displays 702, 704, 710, and 712. The user interfaces illustrated herein are merely for presenting various examples; the invention is not limited to the specific examples shown. For example, various combinations of exemplary displays are considered to be within the scope of this disclosure.

Systems and methods according to the invention may also, once a merchant is selected, prompt the user to either order the same item as previously purchased, or as purchased most frequently, or both, and/or prompt the user to modify the order or select another item.

Additionally, any system or method according to aspects of the invention may include a database, or access one or more databases associated with the user's health. Available information associated with the user's health may include weight, age, medical conditions (such as diabetes, high blood pressure, or heart condition), and/or a diet program. The system may communicate with databases such as the individual's electronic health records, EMR (electronic medical record) and/or PHR (personal health record). The application can match this information with information related to food items, such as blood sugar level, diabetes, high blood pressure, heart condition), and information, such as the sugar amount, salt amount, vitamin amount, contents, cholesterol amount, fat amount or starch amount available from a merchant and suggest items based on the user's medical condition and other factors, such as time of day.

The system is smart and updates over time depending upon the new information it receives, for example based on system updates, new and/or additional data regarding a user or a merchant, and/or the like. In some exemplary embodiments, for example when application 206 is utilized to order a beverage, application 206 may monitor and/or note when the user actually picked up the beverage order. Future order placed with that merchant may take into account lead times for order pickup based on historical lead time information.

For example, user device 202 and/or application 206 may contact a merchant which supplies food items. Based on the information available to the application or device (for example, a user location), and an analysis of the available food items from the merchant and the user's health condition, the device may display a message such as "I see that you are at (or are ordering from) restaurant X. May I suggest meal Y, which has 500 calories and costs $5.75 plus tax?" The user then has the option to select that item or request to review different items from the merchant's menu.

In certain exemplary embodiments, via operation of application 206, user device 202 may be operative to automatically make a location-based payment, for example an access payment for a toll-road. As user device 202 approaches and/or passes an electronic toll sensor, application 206 may prompt the user to confirm that they would like to pay the toll. In some embodiments, application 206 may be configured to automatically pay a toll on behalf of the user, for example via utilizing one or more of the networks and/or techniques disclosed above.

As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet-based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

Exemplary systems and methods are described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, may be implemented by computer program instructions operative on computer hardware.

Via application of principles of the present disclosure, operation of user device 202 may be improved. For example, via operation of application 206, a user may spend less time utilizing user device 202 searching for directions, searching for suitable restaurants, reviewing electronic menus, and/or the like, thus saving battery life on user device 202 and allowing user device 202 to operate for a longer period of time between charges. Additionally, via operation of application 206, electricity use in network 210 and/or at merchant device 204 may be reduced, for example due to streamlining of order processes and/or elimination of redundant and/or inefficient steps. Yet further, the security of operation of user device 202, merchant device 204, and/or network 210 is improved, for example by eliminating the communication to a merchant device 204 of payment card information associated with a user of user device 202. In this manner, fraud and abuse may be reduced.

Functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Systems, methods and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one," unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. The disclosure includes a system and method, and it is contemplated that it may be embodied as computer program instructions on a tangible computer-readable carrier, such as a magnetic or optical memory or a magnetic or optical disk. All structural, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure for it to be encompassed by the present claims.

What is claimed is:

1. A computer system configured for ordering of store items and electronic payment without disclosing a user's monetary account number, the system comprising:

a user device comprising a processor, a memory, a display, a graphical user interface (GUI) configured to permit input by a user, a transmitter, a user application, and a global positioning system (GPS);

a payment issuer server in communication with the user's monetary account and with the user device;

a merchant server in communication with the user device and in communication with a products database that contains information, including price, about one or more products provided by a merchant, wherein the merchant server is configured to receive an order for the one or more products from the user device;

a health records database in communication with the user device that contains the user's health factors and electronic medical record, wherein the user's health factors comprise one or more of diabetes, high blood pressure, or a heart condition;

a merchant payment device in communication with the merchant server;

a merchant bank server in communication with a merchant account, the merchant payment device, and the payment issuer server; and a cloud service provider server in communication with the payment issuer server, the user device, and the merchant server, wherein (a) the user device is configured to communicate with the payment issuer server through the cloud service provider server after receiving the price for one or more suggested products from the cloud service provider server in response to the merchant server receiving the order from the cloud service provider server, (b) the payment issuer server verifies that the user's monetary account has sufficient funds to pay the price, (c) a payment is transferred to the merchant bank server by the cloud service provider server for the one or more suggested products after a predetermined period of time without revealing an account number of the user and the account number remains private to the user, (d) the merchant server is configured to determine the one or more suggested products to suggest to the user device based on the user's health factors and electronic medical record, a GPS location of the user device, and available products from the merchant, and (e) the merchant server is configured to cause the GUI to display natural language text comprising the one or more suggested products and at least one nutritional attribute of the one or more suggested products relevant to the user's health factors, the one or more suggested products displayed on the GUI and the GUI being updated upon a user request via the GUI to review different products, (f) the cloud service provider server transmits a verification of the payment to the user device after the cloud service provider server receives the payment from the user device.

2. The computer system of claim 1, wherein the user device is configured to determine by the GPS and the user application, a proximity of the user device to a physical location of the merchant.

3. The computer system of claim 1, wherein the products database includes nutritional information of one or more food items and the nutritional information is transmitted by the merchant server to the user device, and the nutritional information comprises the at least one nutritional attribute.

4. The computer system of claim 3, wherein the memory includes dietary restrictions of the user, and the user's health factors further comprise the dietary restrictions.

5. The computer system of claim 1, wherein the user device is further configured to transmit a user account number to the cloud service provider server.

6. The computer system of claim 1, wherein the merchant bank server is configured to transmit the payment to a merchant bank account.

7. The computer system of claim 1, further comprising the memory being configured to store at least two of (a) the merchant's name, (b) one or more products previously ordered from the merchant, (c) price information for the one or more products previously ordered, (d) a location of the merchant, and (e) current offers by the merchant for a sale of each of the one or more products.

8. The computer system of claim 1, wherein the memory is configured to store information regarding one or more previous visits by the user to the merchant and the products purchased during the one or more previous visits.

9. The computer system of claim 1, wherein the merchant server is further configured to transmit to the user device, a signal with a time at which the order will be ready; and the GUI comprises the time at which the order will be ready.

10. The computer system of claim 1, wherein the processor is configured to determine, utilizing the GPS, merchants within a given distance from the user device that have products desired by the user.

11. The computer system of claim 1, wherein the user device is configured to transmit to the cloud service provider server, responsive to the user selecting a function of the user application using the GUI, authorization for payment for a second order at the merchant belonging to someone other than the user.

12. The computer system of claim 4, wherein the memory includes at least one of the user's health factors; wherein the user's health factors further comprise weight, age, measured blood sugar level, measured blood pressure, the heart condition, diabetic status, and pregnancy status; and wherein the user application is configured to determine one or more products appropriate for the user by comparing the nutritional information to the at least one of the user's health factors.

13. The computer system of claim 3, wherein the nutritional information of the one or more food items comprises at least one of: an ingredient list, amount by weight of an ingredient, calorie information, carbohydrate information, vitamin information, fat information, or sugar information.

14. The computer system of claim 1, wherein the user device is further configured to transmit, to the merchant server, an instruction to place one or more orders in a queue maintained on the merchant server.

15. The computer system of claim 12, wherein the user application is configured to display an alert on the GUI when a selected food item is deemed incompatible with dietary constraints of the user.

16. The computer system of claim 1, wherein the merchant server is configured to suggest at least one of the one or more products to the user device based on one or more of (a) sales items, (b) the user's past purchases, and (c) a location of the user device.

17. The computer system of claim 1, wherein the user's monetary account is one of a credit account, a debit account, and a bank account.

* * * * *